United States Patent
Sukegawa et al.

(10) Patent No.: US 10,309,337 B2
(45) Date of Patent: Jun. 4, 2019

(54) CONTROL DEVICE FOR INTERNAL COMBUSTION ENGINE

(71) Applicant: Hitachi Automotive Systems, Ltd., Hitachinaka-shi, Ibaraki (JP)

(72) Inventors: Yoshihiro Sukegawa, Tokyo (JP); Takashi Okamoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 67 days.

(21) Appl. No.: 15/531,490

(22) PCT Filed: Nov. 25, 2015

(86) PCT No.: PCT/JP2015/082970
§ 371 (c)(1),
(2) Date: May 30, 2017

(87) PCT Pub. No.: WO2016/088608
PCT Pub. Date: Jun. 9, 2016

(65) Prior Publication Data
US 2018/0291833 A1 Oct. 11, 2018

(30) Foreign Application Priority Data
Dec. 5, 2014 (JP) .................. 2014-246409

(51) Int. Cl.
*F02D 41/40* (2006.01)
*F02D 41/20* (2006.01)
(Continued)

(52) U.S. Cl.
CPC ....... *F02D 41/401* (2013.01); *F02D 13/0203* (2013.01); *F02D 13/0265* (2013.01);
(Continued)

(58) Field of Classification Search
CPC ............... F02D 41/34; F02D 2041/001; F02D 2041/2055; F02D 2041/389; F02D 2200/0608
See application file for complete search history.

(56) References Cited

U.S. PATENT DOCUMENTS 6,055,948 A * 5/2000 Shiraishi ................... F01L 1/34
123/243
6,082,338 A 7/2000 Izutani et al.
(Continued)

FOREIGN PATENT DOCUMENTS

DE 10 2010 038 779 A1 2/2012
DE 10 2011 005 141 A1 9/2012
(Continued)

OTHER PUBLICATIONS

Machine Translation of JP2014118952A.*
(Continued)

*Primary Examiner* — Hieu T Vo
*Assistant Examiner* — Arnold Castro
(74) *Attorney, Agent, or Firm* — Crowell & Moring LLP

(57) ABSTRACT

The purpose of the present invention is to provide a control device for an internal combustion engine with which it is possible to favorably control an engine even if there could occur a difference in temperatures of fuel injected into respective cylinders. The present invention is a control device for an internal combustion engine, for controlling an internal combustion engine provided with fuel injection valves for directly injecting fuel respectively to a plurality of cylinders, wherein: the control device is provided with a fuel temperature acquiring means for acquiring respective temperatures of fuel injected to each of the cylinders; and at least one of a fuel injection valve control amount, ignition control amount, and intake and exhaust valve control amount of each of the cylinders is set in accordance with the
(Continued)

respective temperatures of fuel acquired by the fuel temperature acquiring means. Alternatively, the present invention is a control device for an internal combustion engine, for controlling an internal combustion engine provided with fuel injection valves for directly injecting fuel respectively to a plurality of cylinders, wherein the control device is provided with a valve-closing time detecting means for detecting a valve-closing time of a valve body of each of the fuel injection valves, and a fuel temperature estimating means for estimating the temperature of fuel on the basis of the valve-closing duration of the valves detected by the valve-closing time detecting means.

8 Claims, 12 Drawing Sheets

(51) Int. Cl.

| | | |
|---|---|---|
| *F02D 41/06* | (2006.01) | |
| *F02P 5/15* | (2006.01) | |
| *F02D 41/36* | (2006.01) | |
| *F02D 13/02* | (2006.01) | |
| *F02D 41/04* | (2006.01) | |
| *F02D 45/00* | (2006.01) | |
| *F02P 5/152* | (2006.01) | |
| *F02M 53/06* | (2006.01) | |
| *F02D 41/34* | (2006.01) | |
| *F02D 41/00* | (2006.01) | |
| *F02D 41/38* | (2006.01) | |

(52) U.S. Cl.
CPC .......... *F02D 41/04* (2013.01); *F02D 41/064* (2013.01); *F02D 41/20* (2013.01); *F02D 41/34* (2013.01); *F02D 41/36* (2013.01); *F02D 45/00* (2013.01); *F02M 53/06* (2013.01); *F02P 5/152* (2013.01); *F02P 5/1502* (2013.01); *F02D 2041/001* (2013.01); *F02D 2041/2055* (2013.01); *F02D 2041/389* (2013.01); *F02D 2200/0608* (2013.01); *Y02T 10/18* (2013.01); *Y02T 10/44* (2013.01); *Y02T 10/46* (2013.01)

(56) References Cited

U.S. PATENT DOCUMENTS

| | | | |
|---|---|---|---|
| 2004/0255900 A1* | 12/2004 | Mehta | F02M 31/125 |
| | | | 123/305 |
| 2004/0261761 A1 | 12/2004 | Hayakawa et al. | |
| 2006/0157034 A1* | 7/2006 | Gottlieb | F02M 51/0603 |
| | | | 123/470 |
| 2009/0139499 A1* | 6/2009 | Barra | F02D 41/3809 |
| | | | 123/552 |
| 2012/0006289 A1 | 1/2012 | Petz et al. | |
| 2013/0180511 A1 | 7/2013 | Hess et al. | |
| 2014/0100762 A1 | 4/2014 | VanDerWege et al. | |
| 2015/0068495 A1* | 3/2015 | Pursifull | F02M 41/00 |
| | | | 123/456 |
| 2015/0362382 A1 | 12/2015 | Bauer | |
| 2017/0022927 A1* | 1/2017 | Sanborn | F02M 59/20 |
| 2017/0342936 A1* | 11/2017 | Pursifull | F02D 41/3854 |
| 2018/0149107 A1* | 5/2018 | Morris | F02D 35/027 |

FOREIGN PATENT DOCUMENTS

| | | |
|---|---|---|
| DE | 10 2013 201 780 B3 | 2/2014 |
| DE | 10 2013 219 669 A1 | 6/2014 |
| DE | 10 2013 201 500 A1 | 7/2014 |
| EP | 2 028 362 A2 | 2/2009 |
| EP | 2 343 445 A1 | 7/2011 |
| EP | 2 388 583 A1 | 11/2011 |
| JP | 11-36918 A | 2/1999 |
| JP | 2005-16496 A | 1/2005 |
| JP | 2009-47055 A | 3/2009 |
| JP | 2013-224623 A | 10/2013 |
| JP | 2014-118952 A | 6/2014 |

OTHER PUBLICATIONS

Extended European Search Report issued in counterpart European Application No. 15866118.1 dated Jun. 14, 2018 (eight pages).
International Search Report (PCT/ISA/210) issued in PCT Application No. PCT/JP2015/082970 dated Feb. 23, 2016 with English translation (5 pages).
Japanese-language Written Opinion (PCT/ISA/237) issued in PCT Application No. PCT/JP2015/082970 dated Feb. 23, 2016 (4 pages).

* cited by examiner

CONTROL DEVICE FOR INTERNAL COMBUSTION ENGINE

TECHNICAL FIELD

The present invention relates to a control device for an internal combustion engine.

BACKGROUND ART

In-cylinder direct injection type engines, each of which directly injects fuel into cylinders, are widely known. For example, Japanese Unexamined Patent Application Publication No. 2009-47055 (PTL 1) is disclosed. The regulations on emission and fuel efficiency are strengthened in recent years, and consequently such in-cylinder direct injection type engines require more accurate engine control. For example, in the above-described publication, the fuel injection timing is set according to the concentration of alcohol in composite fuel.

In general, the combustion of an internal combustion engine is influenced by not only the alcohol concentration but also various kinds of environmental conditions. In particular, the temperature of fuel exerts an influence on a vaporization rate of fuel spray, the temperature of in-cylinder air-fuel mixture, and the like. Fuel that is supplied into an engine cylinder is heated by heat transferred from a fuel rail and a fuel injection valve. In particular, in the case of in-cylinder direct injection type engines, heat generated by the combustion causes the temperature of a fuel injection valve to become high. Therefore, the fuel temperature measured when the fuel is supplied to the cylinder is considerably higher than the fuel temperature measured at the time of fuel-pump discharging. In addition, in the case of multi-cylinder engines, dispersion in combustion on a cylinder basis, the temperature distribution of an engine block, and the like cause a difference in fuel temperature among cylinders. Therefore, in order to increase the emission performance, the fuel efficiency performance, the output performance and the like, it is important to detect a difference in fuel temperature among cylinders, and then to control the engine according to the difference.

Japanese Unexamined Patent Application Publication No. 2014-118952 (PTL 2) discloses a means for measuring the temperature of fuel injected into cylinders. A fuel injection device in this publication is provided with a temperature sensor for measuring the temperature of fuel in the upstream of a sheet part in a nozzle body.

CITATION LIST

Patent Literature

PTL 1: Japanese Unexamined Patent Application Publication No. 2009-47055
PTL 2: Japanese Unexamined Patent Application Publication No. 2014-118952

SUMMARY OF INVENTION

Technical Problem

As disclosed in PTL 2, providing a temperature sensor inside a fuel injection valve causes a structure of the fuel injection valve to be complicated, and therefore there is a possibility that manufacturing costs will increase. In addition, the fuel temperature generally differs from the temperature of the fuel injection valve. However, in the method disclosed in PTL 2, since the temperature sensor is arranged adjacently to a wall surface of the nozzle body, the measured temperature is influenced by the wall temperature of the nozzle body, and therefore there is a possibility that a measurement error of the fuel temperature will increase. Moreover, the heat capacity of the temperature sensor causes a time delay of the temperature detection, and therefore there is a possibility that the control will be incapable of following a change in fuel temperature.

Accordingly, the purpose of the present invention is to provide a control device for an internal combustion engine with which it is possible to favorably control an engine even if there could occur a difference in temperatures of fuel injected into respective cylinders.

Solution to Problem

In order to solve the above-described problems, for example, the configurations set forth in claims are employed.

The present invention is a control device for an internal combustion engine, that controls an internal combustion engine provided with fuel injection valves for directly injecting fuel respectively into a plurality of cylinders, the control device including a fuel temperature acquiring unit that acquires respective temperatures of fuel injected into the cylinders respectively, wherein at least one of a fuel injection valve control amount, ignition control amount, and intake and exhaust valve control amount of each of the cylinders is set in accordance with the respective temperatures of fuel acquired by the fuel temperature acquiring unit.

Alternatively, the present invention is a control device for an internal combustion engine, that controls an internal combustion engine provided with fuel injection valves for directly injecting fuel respectively into a plurality of cylinders, the control device including a valve-closing time detecting unit that detects a valve-closing time of a valve body of each of the fuel injection valves, and a fuel temperature estimating unit that estimates the temperature of fuel on the basis of the valve-closing duration of the valves detected by the valve operation detecting unit.

Advantageous Effects of Invention

According to the present invention, an engine can be favorably controlled even when there could occur a difference in temperatures of fuel injected into respective cylinders.

BRIEF DESCRIPTION OF DRAWINGS

FIG. 9 shows an example in which the valve-closing timing is determined by an inflection point of a driving voltage waveform.

FIG. 15 shows a comparison made when fuel temperatures differ from each other.

FIG. 19 shows an engine configuration in which nozzles of fuel injection valves are provided with heaters 110a to 110d respectively.

FIG. 21 shows an engine configuration provided with an electromagnetic intake valve 71 and an electromagnetic exhaust valve 81.

DESCRIPTION OF EMBODIMENTS

Embodiments will be described below with reference to drawings.

Embodiment

An engine system, and a configuration of an engine, according to one embodiment of the present invention will be described with reference to FIG. 1.

Figure 1:
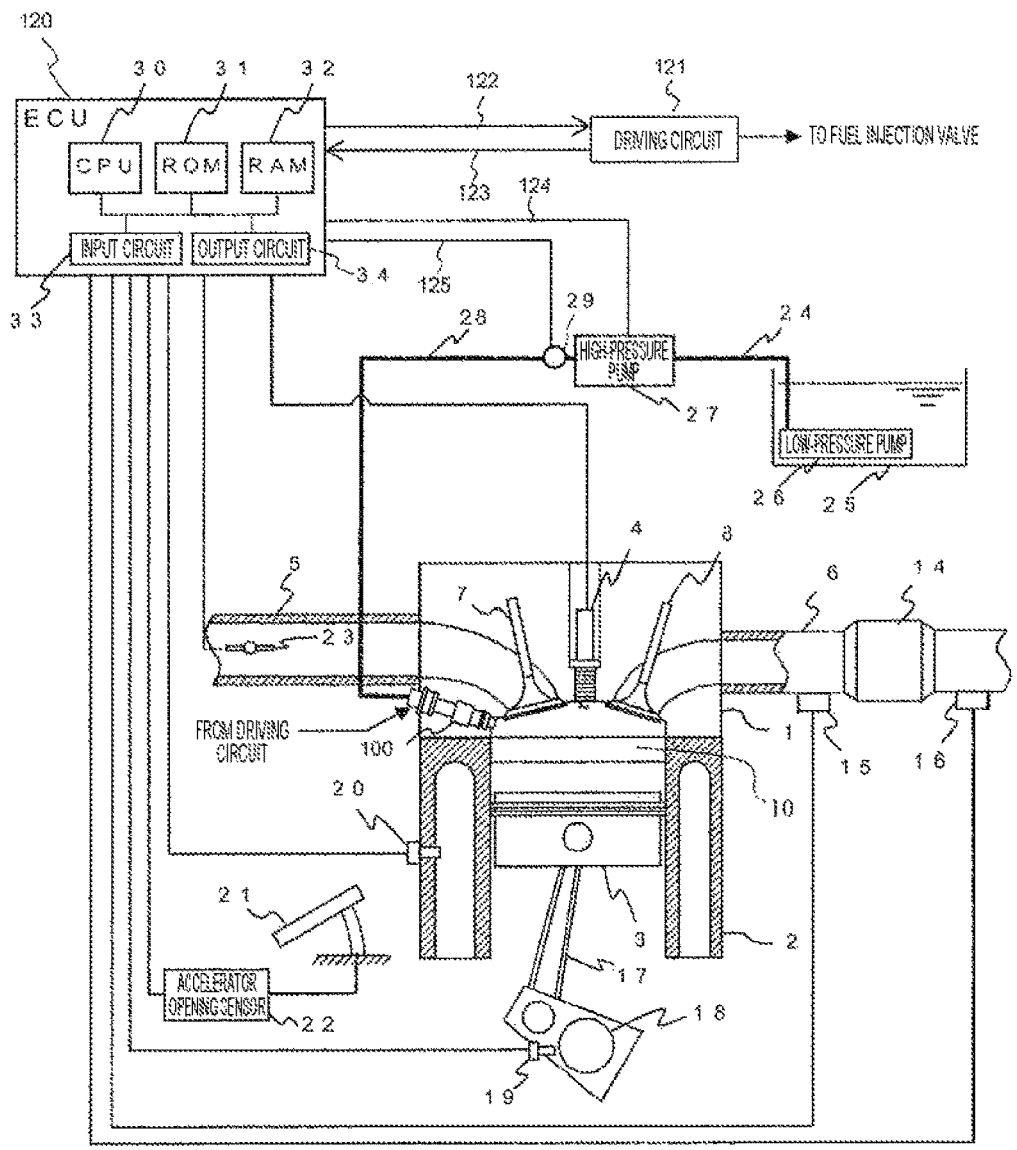
FIG. 1 is a diagram illustrating an engine system according to one embodiment of the present invention.

FIG. 1 schematically illustrates a configuration of an engine. In the present example, a four-cycle engine includes a combustion chamber 10 that is composed of an engine head 1, a cylinder block 2, a piston 3, an intake valve 7 and an exhaust valve 8. The cylinder block 2 is provided with a fuel injection valve 100, and an injection nozzle of the fuel injection valve 100 penetrates the combustion chamber 10, thereby forming, what is called, an in-cylinder direct injection type engine.

The piston 3 is joined to a crank shaft 18 through a connecting rod 17, and the crank shaft 18 is provided with a crank angle sensor 19 that is capable of detecting a crank angle and the number of revolutions of the engine. The cylinder block 2 is provided with a water temperature sensor 20 for detecting the temperature of cooling water. An intake pipe 5 is provided with a throttle valve 23 capable of adjusting the amount of intake air; and an airflow sensor (not illustrated) capable of detecting the amount of intake air is provided in the upstream thereof. An exhaust pipe 6 is provided with a three-way catalyst 14; an air-fuel ratio sensor 15 is provided on the upstream side thereof; and an O2 sensor 16 is provided on the downstream side.

An accelerator pedal 21 is provided with an accelerator opening sensor 22 for detecting the amount of stepping by a driver.

Fuel pressurized by a low-pressure pump 26 provided in a fuel tank 25 is transferred to a high-pressure pump 27 through a low-pressure fuel pipe 24. The fuel pressurized to approximately 5 to 30 MPa by the high-pressure pump 27 is transferred to the fuel injection valve 100 through a high-pressure fuel pipe 28. The fuel pressure of the high-pressure pump 27 is set by a fuel-pressure instruction value 124 that is transmitted from an ECU 120 to the high-pressure pump 27.

A fuel temperature in the high-pressure fuel pipe 28 is detected by a fuel temperature sensor 29, and a fuel temperature value 125 is input into the ECU 120.

The ECU 120 includes: a Central Processing Unit (CPU) 30 that executes operation processing according to a set program; a Read-Only Memory (ROM) 31 that stores a control program and data required for operation; a Random-Access Memory (RAM) 32 that temporarily stores the operation result; an input circuit 33 that receives a signal from each sensor; and an output circuit 34 that transmits a signal to each unit on the basis of the operation result. The ECU 120 determines the injection timing and injection duration of a fuel injector 100, the ignition timing of a spark plug 4, the fuel pressure of the high-pressure pump 27, a degree of opening of the throttle valve 23 and the like on the basis of detection values of sensors such as the accelerator opening sensor 22, a cooling-water temperature sensor 20, the air-fuel ratio sensor 15 and the O2 sensor 16. The ECU 120 transmits a control signal to each of the units, and places predetermined operation conditions on the engine.

The fuel injection valve 100 is driven by a driving circuit 121. More specifically, the ECU 120 transmits an injection instruction value 122 to the driving circuit 121, and the driving circuit 121 outputs, to the injection valve 100, a driving current that is capable of opening the injection valve 100 in the timing, and for the duration, corresponding to the injection instruction value 122. In addition, the driving circuit 121 transmits a driving voltage value 123 of the injection valve to the ECU 120.

Next, how a fuel injection valve and a drive unit thereof are configured in the present example, and the basic operation of the fuel injection valve and the drive unit, will be described with reference to FIG. 2.

Figure 2:
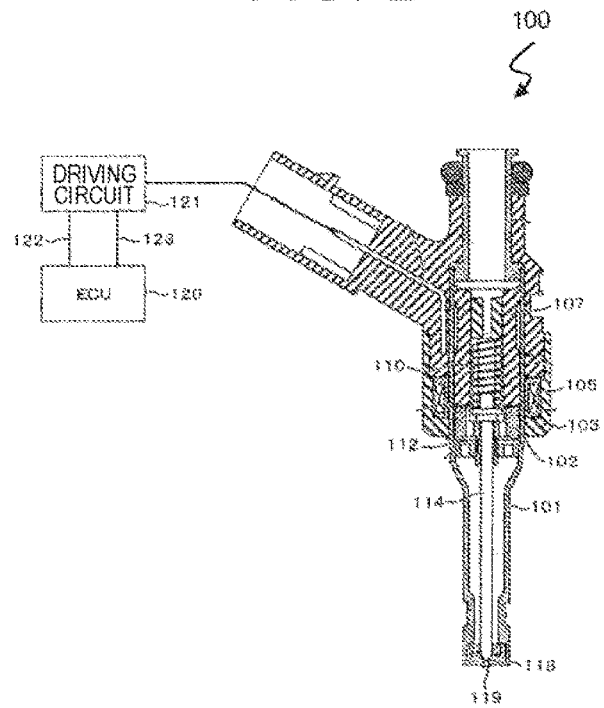
FIG. 2 is a longitudinal sectional view of a fuel injection valve 100.

FIG. 2 is a longitudinal sectional view of the fuel injection valve 100, and shows, as an example, how the driving circuit 121 for driving the fuel injection valve, and the ECU 120, are configured. In the present example, the ECU 120 and the driving circuit 121 are configured as separate components. However, the ECU 120 and the driving circuit 121 may be configured as a one-piece component.

The ECU 120 fetches signals each indicating a state of the engine from various kinds of sensors, and properly calculates the width of an injection pulse and the injection timing according to operation conditions of the internal combustion engine. The injection instruction value 122 output from the ECU 120 is input into the driving circuit 121 of the fuel injection valve. The driving circuit 121 controls a voltage to be applied to a solenoid (coil) 105 provided in the fuel injection valve 100, and supplies a driving current to the fuel injection valve 100. In addition, a voltage value 123 applied to the solenoid (coil) 105 is transmitted from the driving circuit 121 to the ECU 120, thereby enabling the ECU 120 to read the voltage value 123.

The configuration and operation of the fuel injection valve 100 will be described with reference to the longitudinal section of the fuel injection valve 100. The fuel injection valve 100 shown in FIG. 2 is a solenoid valve (electromagnetic fuel injection valve) that is closed during normal operation. In a state in which the solenoid 105 is not energized, the valve body 114 is biased by a spring 110 to adhere to a valve sheet 118, and consequently the valve body 114 is brought into a closed state. In this closed state, a zero spring 112 causes a moving part 102 to adhere to the valve body 114, and thus there is a gap between the moving part 102 and a magnetic core 107 with the valve body 114 closed. Fuel is supplied from the upper part of the fuel injection valve, and the fuel is sealed by the valve sheet 118. When the valve is closed, the force generated by the spring 110 and the force generated by the fuel pressure act on the valve body, which causes the valve body to be pushed in a closing direction.

A magnetic circuit that generates the electromagnetic force for an opening and closing valve includes: a nozzle holder 101 that is a cylindrical member arranged on the outer periphery side of the magnetic core 107 and the moving part 102; the magnetic core 107; the moving part 102; and a housing 103. When a current is supplied to the solenoid 105, magnetic flux occurs in the magnetic circuit, and consequently the magnetic attraction force is generated between the moving part 102, which is a movable part, and the magnetic core 107. When the magnetic attraction force that acts on the moving part 102 exceeds the sum of a load by the spring 110 and the force that acts on the valve body, and that is generated by the fuel pressure, the moving part 102 moves upward. In this case, the valve body 114 moves upward together with the moving part 102, and moves until the top surface of the moving part 102 collides with the lower surface of the magnetic core 107. As the result, the valve body 114 is spaced away from the valve sheet 118, and the supplied fuel is injected from an injection opening 119.

Next, after the top surface of the moving part 102 collides with the lower surface of the magnetic core 107, the valve body 114 is released from the moving part, and is overshoot. However, after a fixed period of time, the valve body 114 stands still on the moving part 102. When the supply of the current to the solenoid 105 is stopped, the magnetic flux occurring in the magnetic circuit decreases, and consequently the magnetic attraction force decreases.

When the magnetic attraction force becomes lower than the sum of the load by the spring 110 and the fluid force that is applied to the valve body 114 and the moving part 102 by the fuel pressure, the moving part 102 and the valve body 114 move downward, and when the valve body 114 collides with the valve sheet 118, the moving part 102 is released from the valve body 114. Meanwhile, after the valve body 114 collides with the valve sheet 118, the valve body 114 stands still, and the injection of the fuel stops.

Figure 3:
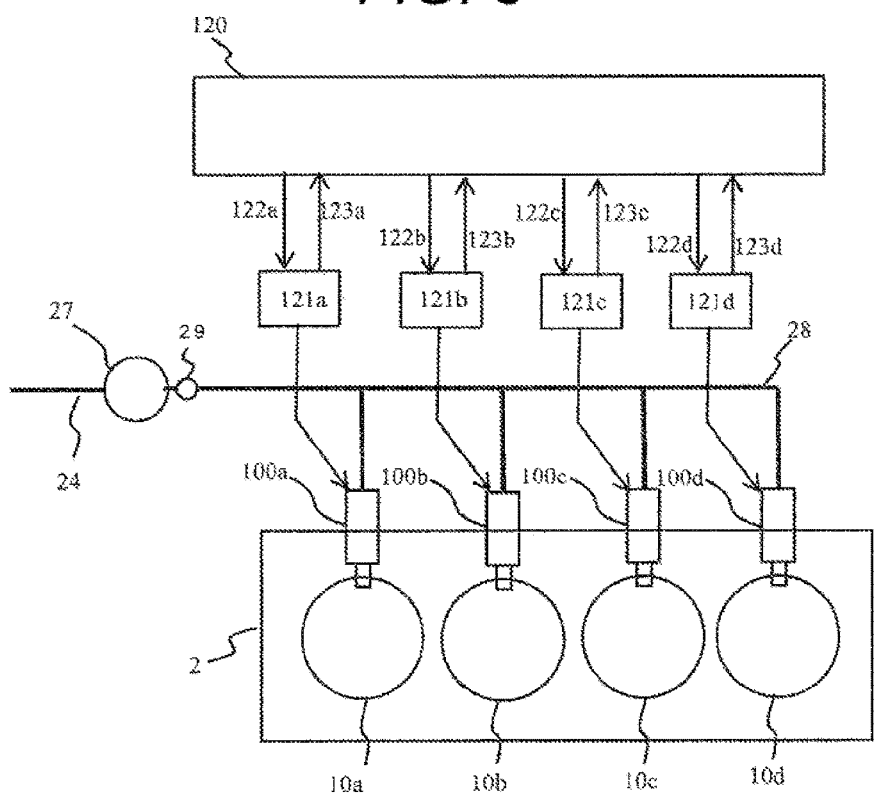
FIG. 3 is an overall view illustrating an engine according to the present embodiment.

Next, the overall configuration of the engine will be described with reference to FIG. 3. This engine has a four-cylinder configuration, and a cylinder block 2 is provided with four combustion chambers 10a, 10b, 10c, 10d. In addition, the combustion chambers 10a, 10b, 10c, 10d are provided with fuel injection valves 100a, 100b, 100c, 100d respectively. The fuel injection valves 100a, 100b, 100c, 100d are driven by driving circuits 121a, 121b, 121c, 121d respectively. The ECU 120 transmits injection instruction signals 122a, 122b, 122c, 122d to the driving circuits 121a, 121b, 121c, 121d respectively. Moreover, driving voltage values 123a, 123b, 123c, 123d are transmitted from the driving circuits 121a, 121b, 121c, 121d to the ECU 120 respectively.

In other words, the ECU 120 is configured to be capable of independently driving the fuel injection valves 100a, 100b, 100c, 100d that are provided in the respective combustion chambers, and the ECU 120 is configured to be capable of independently reading the driving voltage values 123a, 123b, 123c, 123d.

It should be noted that although the present example shows the configuration example of the four-cylinder engine, the present invention is not limited to the four-cylinder engine. Accordingly, an engine configuration in which the number of cylinders is other than four, for example, a three-cylinder engine and a six-cylinder engine, may be used.

Next, the control flow of the internal combustion engine according to the present embodiment will be described with reference to FIG. 4.

Figure 4:
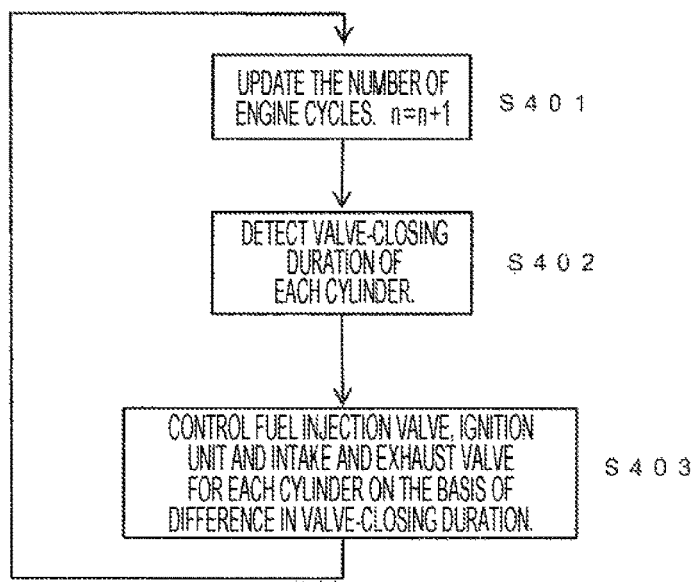
FIG. 4 is a control flowchart of an internal combustion engine.

FIG. 4 is a process flowchart illustrating a process of the internal combustion engine executed by the ECU 120. In a step S401, the number of engine cycles n is updated. Here, the number of engine cycles means a time step number on the assumption that a crank angle of 720° is one unit. Next, in a step S402, the valve-closing duration of a fuel injection valve of each cylinder is detected, subsequently in a step S403, the fuel injection valve, an ignition unit, and intake and exhaust valves for each cylinder is controlled, and the process proceeds to the next engine cycle.

In this manner, in the present embodiment, the valve-closing duration of the fuel injection valve of each cylinder is continuously detected during the engine operation, and the engine is controlled on the basis of the detection results. It should be noted that in the example shown in FIG. 4, although the valve-closing duration of the fuel injection valve is detected on an engine cycle basis, the valve-closing duration of the fuel injection valve may be detected at every predetermined cycles (for example, 10 cycles) or at every predetermined time period (for example, one second) so as to reduce a calculation load of the ECU caused by the detection of the valve-closing duration. Alternatively, the valve-closing duration of the fuel injection valve may be detected in the following manner: for example, when the engine is in a transiently changing state, the valve-closing duration of the fuel injection valve is detected at short cycle intervals, whereas when the engine is in a steady state, the valve-closing duration of the fuel injection valve is detected at long cycle intervals. In addition, a target cylinder for the detection of the valve-closing duration of the fuel injection valve may be switched on an engine cycle basis. For example, in the first cycle, the valve-closing duration of the fuel injection valve of only the first cylinder is detected, and in the second cycle, the valve-closing duration of the fuel injection valve of only the second cylinder is detected. In this manner, a target cylinder for the detection of the valve-closing duration of the fuel injection valve may be switched in order on a cycle basis.

In the present embodiment, in order to obtain an inter-cylinder deviation in the fuel temperature of fuel injected into individual cylinders, the valve-closing duration of the fuel injection valve of each cylinder is detected.

Next, how to obtain an inter-cylinder deviation in the fuel temperature of fuel injected into individual cylinders will be described with reference to FIG. 5 to FIG. 10.

Figure 5:
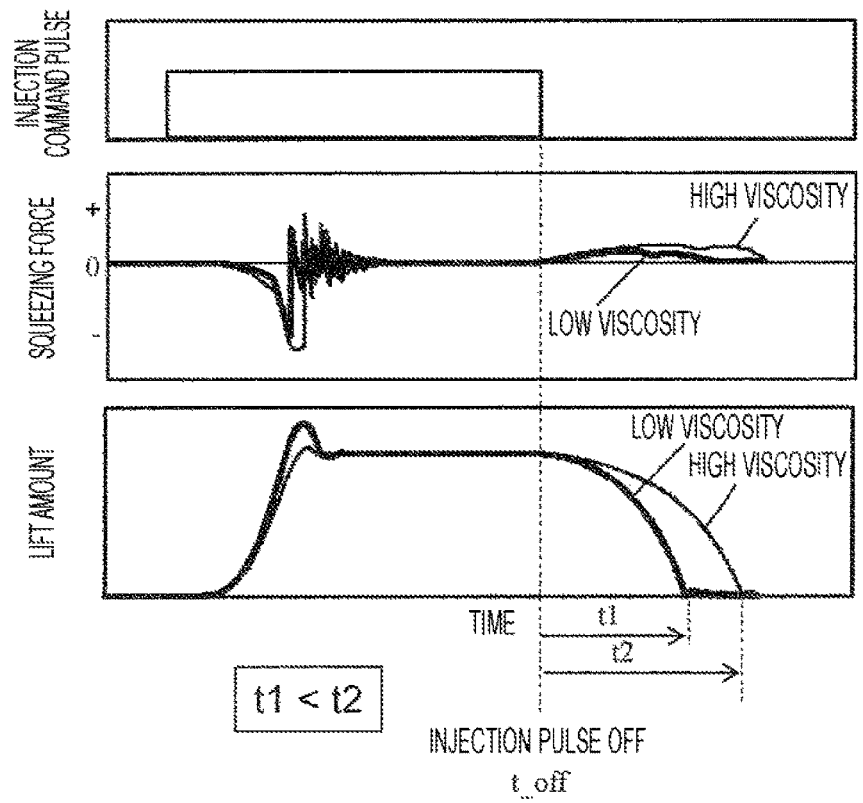
FIG. 5 is a chart illustrating, as an example, an injection command pulse, a temporal change in the squeezing force acting on a valve body of an injection valve, and a temporal change in the lift amount of the valve body.

FIG. 5 shows, as an example, an injection command pulse that is input into the driving circuit 121 of the fuel injection valve 100 from the ECU 120, a temporal change in the squeezing force acting on the valve body 114 of the fuel injection valve 100, and a temporal change in the lift amount of the valve body 114. For the same injection command pulse, comparisons are made between a case where the viscosity (viscosity coefficient) of the fuel is high and a case where the viscosity of the fuel is low. Here, the squeezing force is drag force that is generated by the fuel, and acts on the valve body 114. When the squeezing force has a positive value, it is indicated that the force in a valve-opening direction is acting on the valve body. It is known that among the squeezing force Fsq, the moving speed V of the valve body, a gap h between the valve body and an opposed wall, and the fuel viscosity μ, there is a relationship represented by formula 1. The squeezing force Fsq is proportional to the fuel viscosity. When the valve is closed, the squeezing force Fsq acts in a direction that hinders the valve body from closing, and therefore valve-closing behavior of the valve body changes depending on the fuel viscosity. As indicated in a graph of the lift amount in FIG. 5, the valve-closing timing in the case of low fuel viscosity is earlier than the valve-closing timing in the case of high fuel viscosity. That is to say, the valve-closing timing and the time taken from the injection command pulse OFF timing until the valve body is closed, which are measured when the fuel viscosity is low (t1), are shorter than the valve-closing timing and the time taken from the injection command pulse OFF timing until the valve body is closed, which are measured when the fuel viscosity is high (t2). In other words, a difference in viscosity of fuel can be detected from the difference in the time taken from the injection command pulse OFF timing until the valve body is closed.

$$F_{sq} \propto \frac{V^2 \mu}{h^3}$$ [Formula 1]

Figure 6:
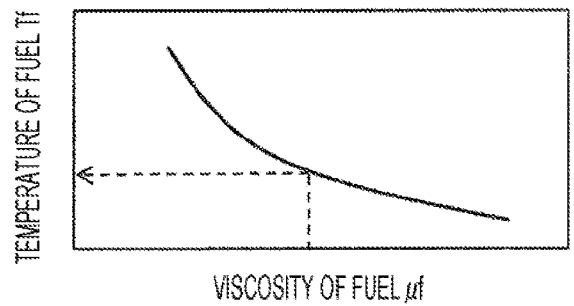
FIG. 6 is a chart illustrating an example of a correlation between the viscosity and temperature of fuel.

Meanwhile, it is known that there is a negative correlation between the temperature of the fuel and the viscosity of the fuel as shown in FIG. 6. Therefore, a difference in the viscosity of the fuel among the cylinders can be known by detecting the time taken from the injection command pulse OFF timing until the valve body is closed. In addition, a difference in the fuel temperature among the cylinders can be obtained from the difference in the viscosity of the fuel among the cylinders by using the correlation in FIG. 6.

In the present technique, since a deviation in fuel temperature is determined from the movement of the valve body of the fuel injection valve, it is not necessary to provide a temperature sensor inside the fuel injection valve or at a position close to the fuel injection valve. Therefore, the control device can be realized at low costs and compactly. Moreover, since the present method is not influenced by the wall temperature and heat capacity of a structure, the present method has the advantage that an inter-cylinder deviation in temperature can be obtained with high accuracy even in a case where a difference in temperature between the structure and the fuel is large, or even in a case where a transient change of the temperature is large.

In addition, in the case of, for example, a four-cylinder engine, a difference in fuel temperature ΔT14 between the first cylinder and the fourth cylinder, which are cylinders at both ends, may be determined from a difference in time taken to close the valve body of the injection valve (or a difference in fuel temperature) between the first cylinder and the fourth cylinder, and a difference in temperature between the other cylinders, that is to say, the second cylinder and the third cylinder, may be determined by interpolation from ΔT14. More specifically, the difference in fuel temperature between the first cylinder and the second cylinder may be determined as follows: ΔT12 =ΔT14/3, and the difference in fuel temperature between the first cylinder and the third cylinder may be determined as follows: ΔT13=2 ×ΔT14/3. Even when the number of cylinders differs, from a difference in time taken to close the valve body of the injection valve (or a difference in fuel temperature) between at least two cylinders, an inter-cylinder deviation in fuel temperature between the other cylinders can be determined by using interpolation in a similar manner. The above method enables to reduce an ECU operation load required to determine a deviation in fuel temperature.

Figure 7:
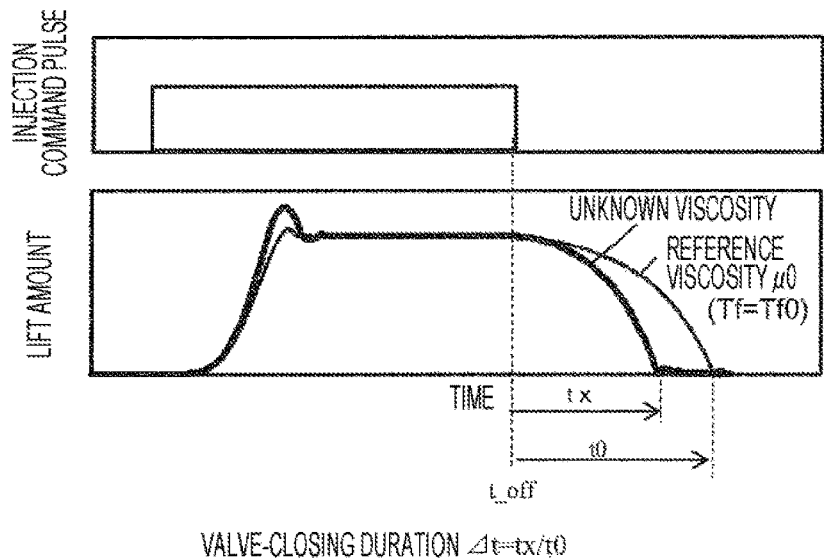
FIG. 7 is a chart illustrating, as an example, an injection command pulse, and a definition of a valve-closing duration change Δt in the lift amount of the valve body of the injection valve.
Figure 8:
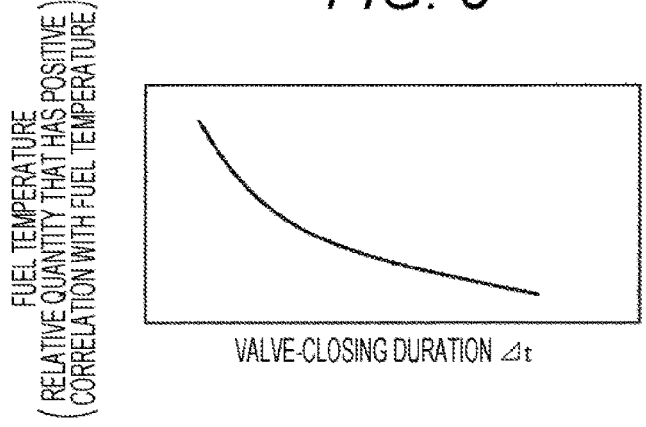
FIG. 8 is a chart illustrating the relationship between a valve-closing duration Δt and the fuel temperature or the relative quantity having a positive correlation with the fuel temperature.

The method for estimating a deviation in fuel temperature in the present embodiment will be described in more detail. FIG. 7 shows, as an example, the injection command pulse of the fuel and a temporal change in the lift amount of the valve body of the fuel injection valve, and the lift amount measured when the fuel viscosity is the reference viscosity μ0 (the fuel temperature is the reference temperature Tf0), and the lift amount measured when the fuel viscosity is unknown (the fuel temperature is unknown), for the same injection command pulse. The reference temperature Tf0 is, for example, 20° C. In addition, the time taken from the injection command pulse OFF timing t_off until the valve body is closed, under the condition of the reference viscosity μ0, is defined as t0. Moreover, the time taken from the injection command pulse OFF timing t_off until the valve body is closed, under the condition of unknown viscosity, is defined as tx. Further, the valve-closing duration Δt is defined as Δt=tx/t0.

The reason why the valve-closing duration Δt is normalized and defined as t0 in this manner is because the influence of differences among individual fuel injection valves, which is exerted on the valve-closing duration, is reduced. In other words, even under the condition of the same fuel viscosity, there is a possibility that, for example, dispersion in the production of fuel injection valves will cause valve-closing behavior of respective valve bodies to differ among the injection valves. It is considered that the influence exerted on the valve-closing behavior, which is caused by the dispersion among individual fuel injection valves, is shown in both tx and t0. Therefore, the influences cancel each other out by using a ratio between tx and t0, and consequently the influence exerted on the valve-closing duration Δt, which is caused by the difference among individual fuel injection valves, is reduced.

In addition, t0 may be, for example, the time taken from the injection command pulse OFF timing until the valve body of the fuel injection valve is closed immediately after engine cold starting. The fuel temperatures of respective cylinders are substantially the same immediately after engine cold starting. Therefore, t0 can be obtained by defining the fuel temperature at this point of time as the reference temperature Tf0. In addition, even when the valve-closing behavior of the fuel injection valves change due to aging or fuel properties, obtaining t0 immediately after engine cold starting enables to reflect the influence of the change on t0.

Figure 9:
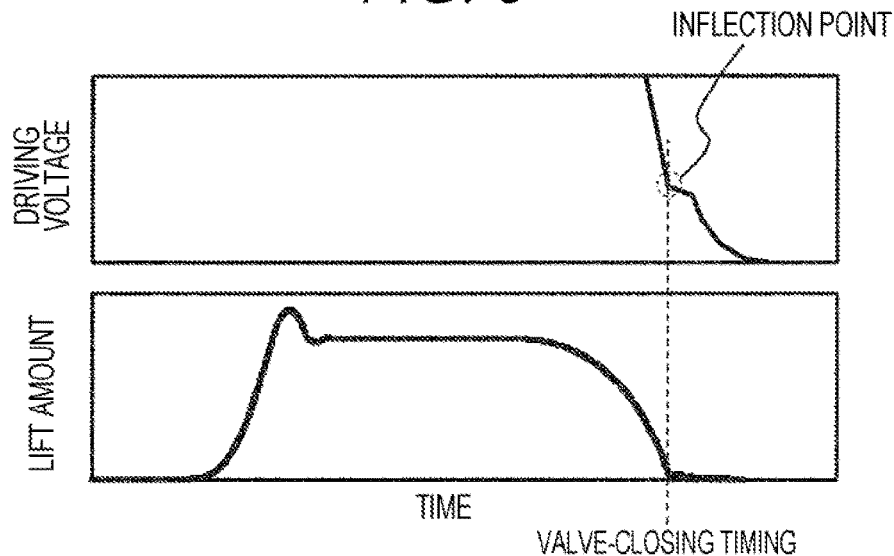
FIG. 9 is a chart illustrating, as an example, a temporal change in the driving voltage of a fuel injection valve, and a temporal change in the lift amount of a valve body.

The relationship between the valve-closing duration Δt obtained in this manner and the fuel temperature (or the relative quantity that has a positive correlation with the fuel temperature) is as shown in FIG. 9. Therefore, a deviation in fuel temperature among the cylinders can be determined from this relationship and Δt detected in each cylinder.

In the present embodiment, the fuel injection valve control amount on a cylinder basis, or the ignition control amount on a cylinder basis, or the intake and exhaust valve control amount on a cylinder basis is determined on the basis of the deviation in fuel temperature among the cylinders determined in this manner. In the present embodiment, it is not always necessary to estimate an absolute value of the fuel temperature. The relative quantity that has a positive correlation with the fuel temperature may be estimated. The correlation characteristic between the fuel viscosity and the fuel temperature shown in FIG. 6 changes depending on fuel properties. However, the qualitative properties that the viscosity decreases with the increase in fuel temperature do not change irrespective of the fuel properties. Therefore, in the present embodiment, it is not necessary to have a correlation characteristic between the fuel viscosity and the fuel temperature on a fuel property basis. Accordingly, the relative quantity having a positive correlation with the deviation in fuel temperature among the cylinders may be determined by using, for example, a correlation characteristic between the fuel viscosity of iso-octane that is a typical fuel constituent and the fuel temperature. This eliminates the need for providing a sensor for detecting fuel properties, and the need for carrying out processing for estimating fuel properties.

Incidentally, in order to determine the valve-closing duration Δt, it is necessary to know the valve-closing timing of the fuel injection valve. With respect to the valve-closing timing of the fuel injection valve, for example, patent publication US 2012/0291757 A1 discloses the technique related to detection from a driving voltage waveform of a fuel injection valve. The method for detecting the valve-closing timing of a fuel injection valve according to the present disclosed technique will be briefly described with reference to FIG. 10.

Figure 10:
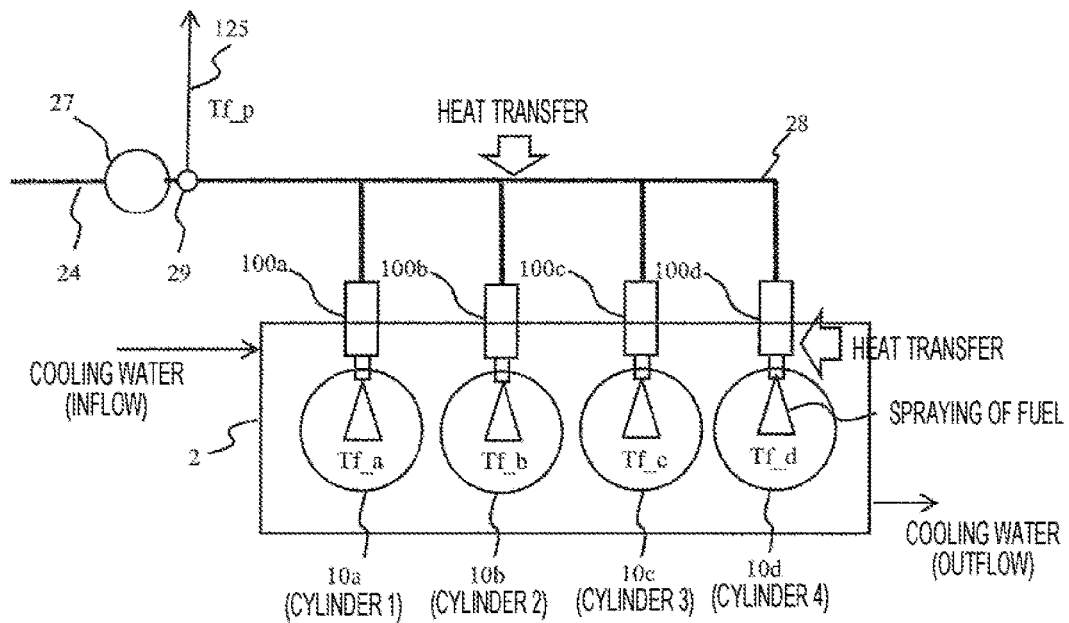
FIG. 10 is an overall view of an engine, the overall view illustrating the relationship among temperatures Tf_a to Tf_d of fuel injected into respective cylinders, and a temperature Tf_p of fuel detected by a temperature sensor in a fuel pipe.

FIG. 10 shows, as an example, a temporal change in the lift amount of a fuel injection valve, and a temporal change in driving voltage of the fuel injection valve. The inductance of a magnetic coil of the fuel injection valve changes with the movement of a core of the fuel injection valve. Therefore, when the valve is closed, an inflection point is generated in a waveform of a driving voltage as shown in FIG. 10. Accordingly, the valve-closing timing of the fuel injection valve can be detected by detecting the time at which the inflection point is generated in the waveform of the driving voltage. The valve-closing duration Δt of the injection valve can be determined by a difference between the valve-closing timing and the injection command pulse OFF timing (t_off).

Figure 11:
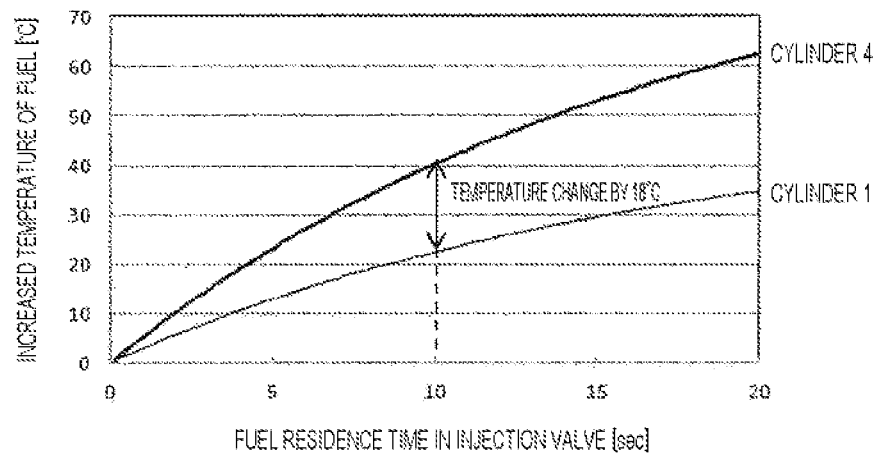
FIG. 11 is a chart illustrating the calculation result that shows the relationship between a time period during which fuel remains in an injection valve and the increased temperature of the fuel.

The fuel temperature of each cylinder estimated by the above-described means differs from the fuel temperature detected by the fuel temperature sensor provided in the high-pressure fuel pipe. As shown in FIG. 11, on the assumption that the fuel temperatures of the respective cylinders are Tf_a, Tf_b, Tf_c, Tf_d, and that the fuel temperature detected by the fuel temperature sensor 29 provided in the high-pressure fuel pipe is Tf_p, the fuel temperatures Tf_a, Tf_b, Tf_c, Tf_d become higher than Tf_p. This is because heat is transferred from the high-pressure fuel pipe 28, the fuel injection valves 100a, 100b, 100c, 100d and the like to fuel. In other words, during the engine operation, the high-pressure fuel pipe 28 and the fuel injection valves 00a, 100b, 100c, 100d have a temperature higher than that of fuel located therein, and therefore the fuel temperature increases while the fuel passes through the high-pressure fuel pipe 28 and the fuel injection valves 00a, 100b, 100c, 100d.

A cooling channel may be provided in such a manner that cooling water that flows into an engine block 2 flows into one side of the engine block 2, and flows out from the other side of the engine block 2, as shown in FIG. 11. In addition, for example, the amount of air and the amount of fuel, which enter each cylinder, and a gas flow in each cylinder, generally disperse among cylinders. As the result, the combustion temperatures of respective cylinders also disperse among the cylinders. In general, the above-described dispersion causes the engine block 2 to have a temperature distribution.

The length of the high-pressure fuel pipe from a high-pressure fuel pump 27 to the fuel injection valves 00a, 100b, 100c, 100d differs on a cylinder basis, and the engine block 2 has a temperature distribution. Therefore, the amount of heat transfer to fuel differs among the cylinders. Accordingly, in general, Tf_a, Tf_b, Tf_c, Tf_d become temperatures that differ from one another.

Figure 12:
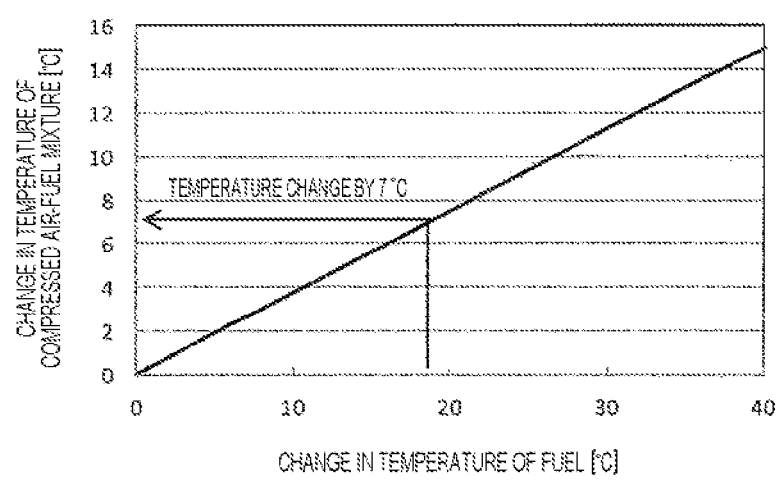
FIG. 12 is a chart illustrating the calculation result that shows the relationship between a change in temperature of fuel and a change in temperature of a compressed air-fuel mixture.

FIG. 12 shows the result of calculating a change in fuel temperature between cylinders by means of numerical simulation. The simulation is based on the assumption that in an in-line four cylinder engine shown in FIG. 11, cooling water flows into the engine block from the cylinder 1 side, and flows out from the cylinder 4 side. The inlet temperature of the cooling water is 80° C., and the outlet temperature thereof is 120° C. In FIG. 12, the horizontal axis indicates the fuel residence time in the injection valve (the time taken immediately after fuel flows into the injection valve until the fuel is injected into a cylinder), and the vertical axis indicates the increased temperature of the fuel in the injection valve. As shown in FIG. 12, fuel receives heat from a wall surface of the fuel injection valve, and consequently the temperature of the fuel increases. The temperature of the cooling water in the cylinder 4 is higher than the temperature of the cooling water in the cylinder 1, which causes the temperature of the fuel injection valve to increase. As the result, the increased temperature of the fuel in the cylinder 4 is also higher than the increased temperature of the fuel in the cylinder 1. In the case of general-purpose in-cylinder direct injection type gasoline engines, the fuel residence time in the injection valve is at a level of 10 seconds. In this case, a difference in fuel temperature between the cylinders is approximately 18° C.

Figure 13:
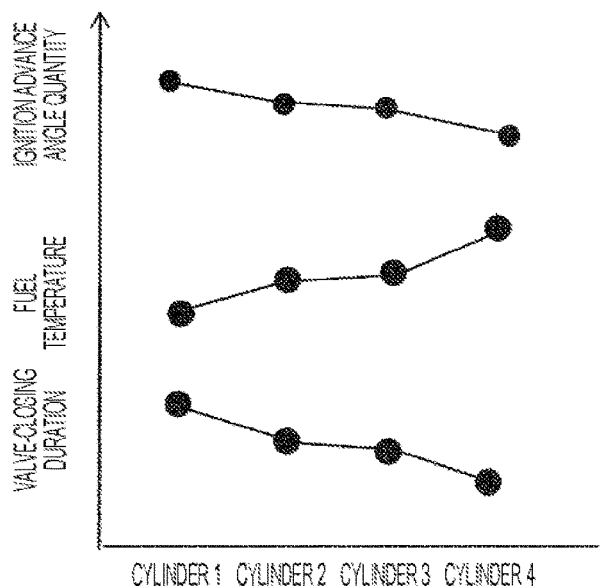
FIG. 13 is a chart illustrating, as an example, how to set the valve-closing duration and ignition advance angle quantity of each cylinder in the present embodiment.

Moreover, FIG. 13 shows the result of calculating a degree of change in the temperature of a compressed air-fuel mixture in a cylinder (the temperature of an air-fuel mixture at the compression top dead center) with respect to a change in the temperature of fuel. From FIG. 13, when the fuel temperature differs by 18° C., the temperature of the compressed air-fuel mixture changes by 7° C.

Difficulty in causing knocking to occur during the high-load operation of the engine is strongly influenced by the temperature of the compressed air-fuel mixture. Knocking is more difficult to occur with the decrease in the temperature of the compressed air-fuel mixture. In other words, the difference in fuel temperature among the cylinders produces a difference in difficulty in causing knocking to occur among the cylinders.

Accordingly, by controlling the engine on the basis of the difference in fuel temperature among the cylinders, it is possible to improve the fuel efficiency and output of the engine while suppressing the occurrence of knocking.

Figure 14:
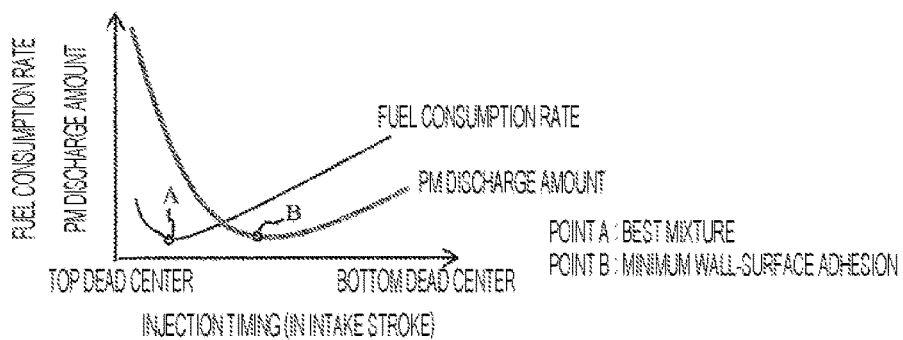
FIG. 14 is a chart illustrating, as an example, the relationship between the fuel injection timing and a fuel consumption rate or the PM discharge amount.

An example in which the fuel efficiency and output of the engine are improved during the high-load operation of the engine will be described with reference to FIG. 14. In the present embodiment, in an engine operation state in which the ignition-timing delay angle control for avoiding knocking is performed, as shown in FIG. 14, the ignition timing of a cylinder in which the valve-closing duration of the fuel injection valve is long (that is to say, the fuel temperature is low) is set on the advance angle side with respect to the ignition timing of a cylinder in which the valve-closing duration of the fuel injection valve is short (that is to say, the fuel temperature is high). Consequently, in a cylinder in which the fuel temperature is low and therefore knocking is difficult to occur, the ignition timing nears the optimum ignition timing (MBT) in which the fuel efficiency and the output performance are high. As the result, in comparison with the case where the ignition timing is the same in all cylinders, the fuel consumption of the engine can be reduced, and the output of the engine can be improved, while the knocking performance is equivalently maintained.

In addition, in another embodiment, by controlling the engine on the basis of the difference in fuel temperature among the cylinders, the fuel efficiency of the engine can be improved while the occurrence of emission is suppressed.

An example in which the fuel consumption of the engine is reduced without increasing the amount of particulate matter (PM) discharged from the engine will be described with reference to FIG. 15 to FIG. 17.

Figure 15:
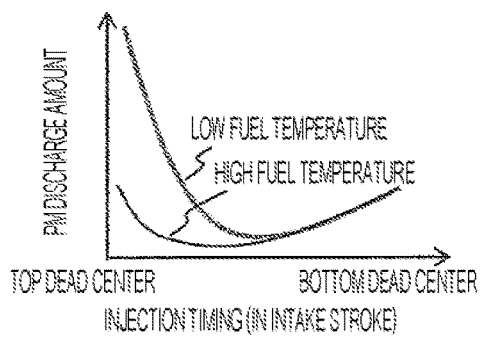
FIG. 15 is a chart illustrating, as an example, the relationship between the fuel injection timing and the PM discharge amount.
Figure 16:
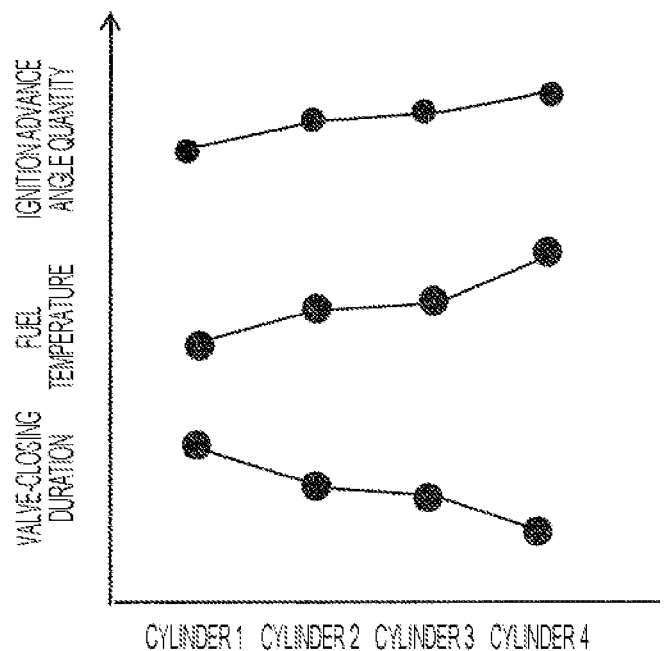
FIG. 16 is a chart illustrating, as an example, how to set the valve-closing duration and injection advance angle quantity of each cylinder in the present embodiment.

FIG. 15 shows the relationship between the fuel injection timing and the discharge amount of particulate matter (PM), or a fuel consumption rate, in an in-cylinder direct injection type gasoline engine. FIG. 15 shows both the relationship between the fuel injection timing and the PM discharge amount in an intake stroke, and the relationship between the fuel injection timing and the fuel consumption rate in the intake stroke, immediately after engine cold starting of the in-cylinder direct injection type gasoline engine. Here, immediately after engine cold starting of the engine means a time period from the engine cold starting of the engine until the temperature of cooling water or the temperature of lubricant in the engine becomes, for example, 60° C.

When the fuel injection timing is advanced (approaches the intake air top dead center), a position of a piston crown surface comes close to the fuel injection valve, and consequently fuel injected into the cylinder largely adheres to the piston crown surface. PM is generated by the diffusion combustion of fuel that adheres to a wall surface, and therefore the PM discharge amount increases under such conditions. Meanwhile, when the fuel injection timing is advanced, the mixing time for fuel and in-cylinder air until the ignition timing becomes longer, and therefore the homogeneity of air-fuel mixture is improved. The improvement in the homogeneity of the air-fuel mixture leads to a decrease in the amount of unburned fuel, and consequently the fuel efficiency is improved. Accordingly, the injection timing (point A) in which the fuel efficiency is the highest is on the advance angle side with respect to the injection timing (point B) at which the PM discharge amount is the lowest. In this manner, the highest-fuel-efficiency injection timing does not coincides with the lowest-PM injection timing, and therefore there arises a problem that when the injection timing is determined so as to minimize the PM discharge amount, the fuel efficiency gets worse.

Meanwhile, when the fuel temperature of fuel injected into the cylinder increases, the vaporization of fuel that adheres to the piston crown surface is accelerated. Therefore, as shown in FIG. 16, the PM discharge amount on the advance angle side of the injection timing decreases in comparison with a case where the fuel temperature of fuel injected into the cylinder is low.

Figure 17:
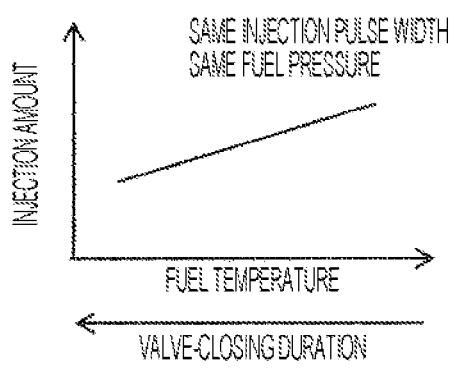
FIG. 17 is a chart illustrating, as an example, a change in the injection amount with respect to the fuel temperature.

Accordingly, in the present embodiment, as shown in FIG. 17, immediately after engine cold starting of the engine, the injection timing of a cylinder in which the valve-closing duration of the fuel injection valve is short (that is to say, the fuel temperature is high) is set on the advance angle side with respect to the injection timing of a cylinder in which the valve-closing duration of the fuel injection valve is long (that is to say, the fuel temperature is low). In the case of a cylinder in which the fuel temperature is high, even if the injection timing is set on the advance angle side, the increase in the amount of PM can be suppressed because the vaporization of fuel adhering to the wall surface is early. In addition, advancing the injection timing enables to form an air-fuel mixture, the homogeneity of which is high. As the result, the fuel consumption of the engine can be reduced without increasing the PM discharge amount.

A vaporization rate of fuel is directly influenced by the fuel temperature. In the present example, the injection timing is determined on the basis of the fuel temperature of fuel actually injected into a cylinder, which enables more accurate control in line with the actual situation of the vaporization rate than determining the injection timing on the basis of the temperature of cooling water or the temperature of lubricant in the engine.

In addition, in another embodiment, by controlling the engine on the basis of the difference in fuel temperature among the cylinders, the dispersion in the fuel injection amount among the cylinders can be decreased, thereby enabling to improve the emission performance and fuel efficiency performance of the engine.

An example in which the emission performance and fuel efficiency performance of the engine is improved by decreasing the dispersion in the fuel injection amount among the cylinders will be described with reference to FIG. 18 and FIG. 19.

Figure 18:
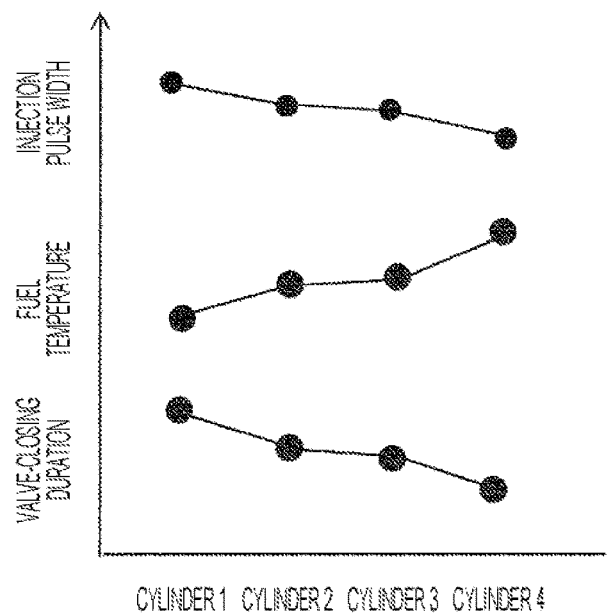
FIG. 18 is a chart illustrating, as an example, how to set the valve-closing duration and injection pulse width of each cylinder in the present embodiment.

FIG. 18 shows the relationship between the fuel temperature of fuel injected into a cylinder and the injection amount under the conditions of the same injection pulse width and the same fuel pressure. The fuel viscosity decreases with the increase in fuel temperature, and therefore the viscous shearing stress between the fuel and the wall surface in the fuel injection valve decreases, which causes the injection amount to increase. Therefore, when there is a deviation in fuel temperature among the cylinders, dispersion in the fuel injection amount occurs among the cylinders, and consequently the emission performance and fuel efficiency performance of the engine decrease.

Figure 19:
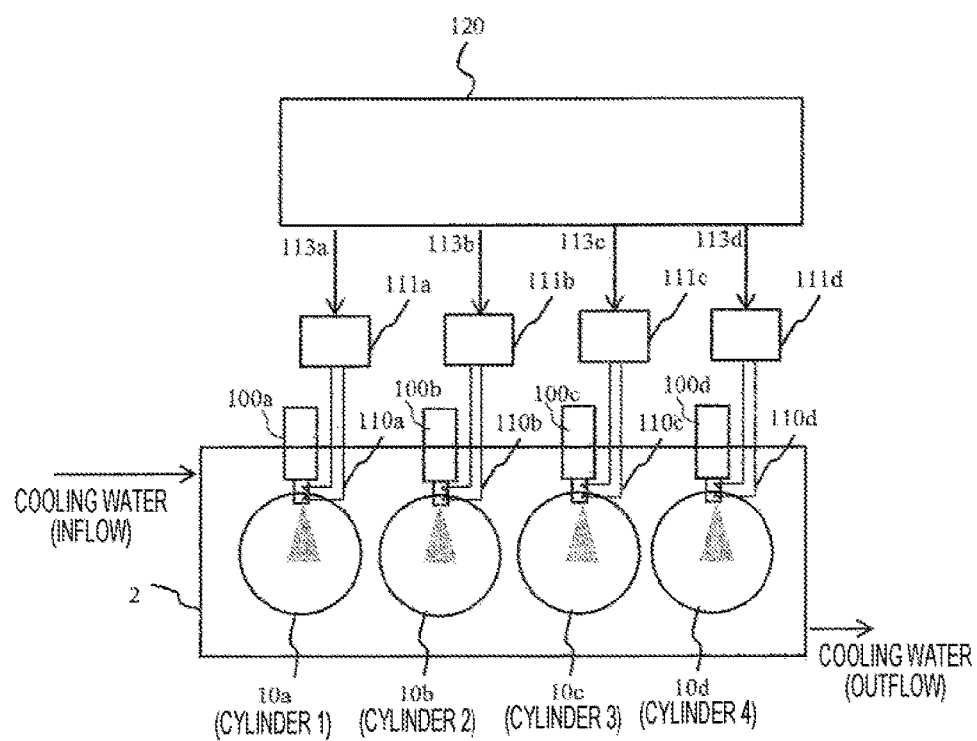
FIG. 19 is an overall view illustrating an engine in the present embodiment.

Accordingly, in the present embodiment, as shown in FIG. 19, the injection pulse width of a cylinder in which the valve-closing duration of the fuel injection valve is short (that is to say, the fuel temperature is high) is set to be shorter than the injection pulse width of a cylinder in which the valve-closing duration of the fuel injection valve is long (that is to say, the fuel temperature is low). As the result, the dispersion in the fuel injection amount caused by the difference in fuel temperature among the cylinders is reduced, and therefore the emission performance and fuel efficiency performance of the engine can be improved.

In addition, in another embodiment, by controlling the engine on the basis of the difference in fuel temperature among the cylinders, ignition dispersion during the Homogeneous-Charge Compression Ignition (HCCI) operation can be reduced, thereby enabling to improve the fuel efficiency, exhaust, and operability (vibrations, noises) of the engine.

An example in which the ignition dispersion during the HCCI operation is reduced to improve the fuel efficiency, exhaust, and operability (vibrations, noises) of the engine will be described with reference to FIG. 20 and FIG. 21.

The HCCI is an operating method in which an air-fuel ratio in a cylinder is made lower than a theoretical air-fuel ratio, and the temperature of an in-cylinder gas is made higher, for example, by heating an intake air gas by use of heat of a residual exhaust gas or the like, and by using a high compression ratio, thereby causing the combustion of an air-fuel mixture by auto-ignition. With respect to the HCCI operation, the auto-ignition timing is strongly influenced by the temperature of the compressed air-fuel mixture. In general, the auto-ignition timing becomes earlier with the increase in temperature of the compressed air-fuel mixture. Therefore, a difference in fuel temperature among the cylinders causes dispersion in the auto-ignition timing among the cylinders. More specifically, the temperature of a compressed air-fuel mixture in a cylinder in which the fuel temperature is high is higher than that of a compressed air-fuel mixture in a cylinder in which the fuel temperature is low, and therefore the auto-ignition timing becomes earlier. In this manner, the dispersion in the auto-ignition timing among the cylinders causes the fuel efficiency, exhaust and operability (vibrations, noises) of the engine to get worse.

Figure 20:
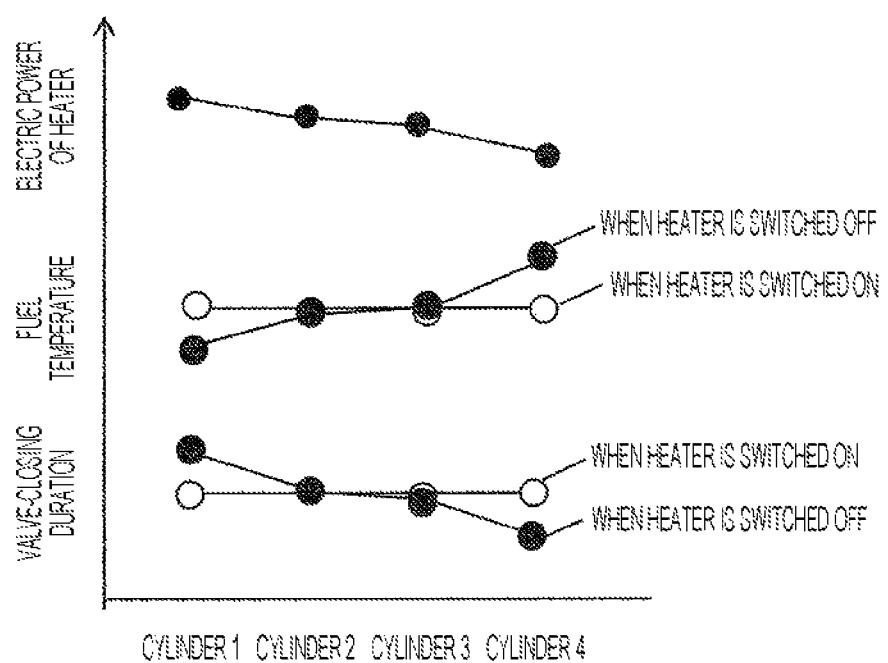
FIG. 20 is a chart illustrating, as an example, how to set the valve-closing duration and heater electric power of each cylinder in the present embodiment.

Accordingly, in the present embodiment, the control in line with the fuel temperatures of the respective cylinders is carried out in the engine configuration shown in FIG. 20, thereby reducing the dispersion in the auto-ignition timing of HCCI.

In the engine configuration shown in FIG. 20, nozzle parts of the fuel injection valves 100a, 100b, 100c, 100d are provided with electric heaters 110a, 110b, 110c, 110d respectively. In addition, heater controllers 111a, 111b, 111c, 111d increase and decrease electric powers, which are supplied to the electric heaters 110a, 110b, 110c, 110d respectively, on the basis of respective instruction values 113a, 113b, 113c, 113d from the ECU 120. Moreover, the ECU 120 controls the electric powers, which are supplied to the electric heaters by the heater controllers respectively, in such a manner that the detected fuel temperatures of the respective cylinders become constant. An example of the fuel temperatures and the heater electric powers, which are controlled in this manner, is shown in FIG. 21.

Figure 21:
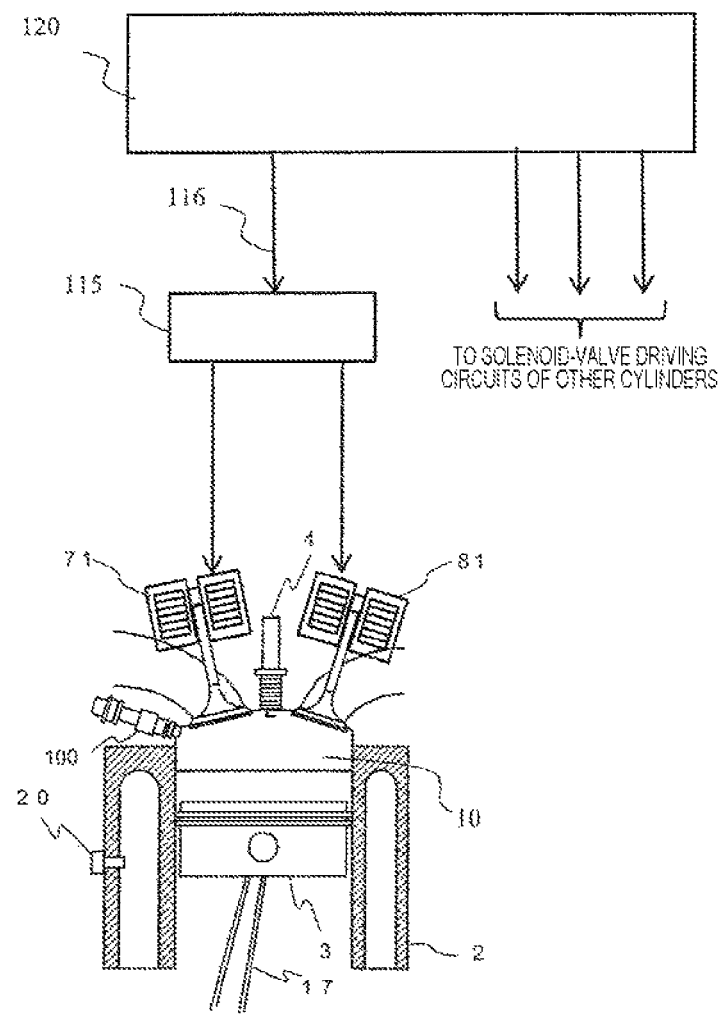
FIG. 21 is an overall view illustrating an engine in the present embodiment.

In the present embodiment, as shown in FIG. 21, when the electric power supplied to an electric heater is zero or minute (for example, 1% or less of the usual electric power supply amount) (hereinafter referred to as "at the time of heater OFF"), the amount of electric power supplied to an electric heater provided in a fuel injection valve of a cylinder in which the valve-closing duration is long (that is to say, the fuel temperature is low) is made larger than the amount of electric power supplied to an electric heater provided in a fuel injection valve of a cylinder in which the valve-closing duration is short (that is to say, the fuel temperature is high). Consequently, the fuel temperatures of fuel injected into the respective cylinders are uniformized. Accordingly, the deviation in temperature of the compressed air-fuel mixture among the cylinders decreases, which causes the dispersion in the auto-ignition timing during the HCCI operation to decrease. As the result, the fuel efficiency, exhaust, and operability (vibrations, noises) of the engine can be improved.

Moreover, another example in which the ignition dispersion during the HCCI operation is reduced to improve the fuel efficiency, exhaust, and operability (vibrations, noises) of the engine will be described with reference to FIG. 22 to FIG. 24.

Figure 22:
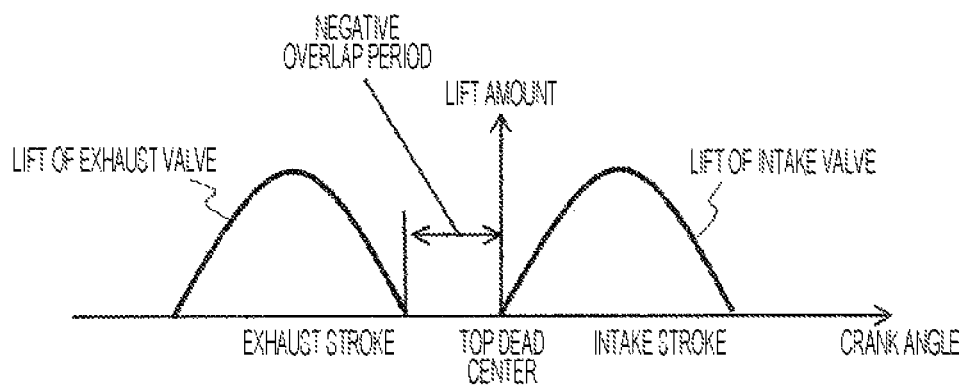
FIG. 22 is a chart illustrating, as an example, how to set the intake and exhaust valve timings at the time of HCCI operation.

FIG. 22 is a diagram illustrating an engine configuration for implementing another example in which the ignition timing of HCCI is reduced. The engine is provided with an electromagnetic intake valve 71 and an electromagnetic exhaust valve 81. The electromagnetic intake valve 71 and the electromagnetic exhaust valve 81 are driven by a solenoid-valve driving circuit 115, and the opening and closing timings of the intake and exhaust valves are set by a solenoid-valve control instruction value 116 from the ECU 120. FIG. 22 illustrates only a configuration of one cylinder of the multicylinder engine for the sake of simplification. However, the other cylinders also have similar configurations. Such a configuration enables the ECU 120 to set the opening and closing timings of the intake and exhaust valves of each cylinder on a cylinder basis.

Figure 23:
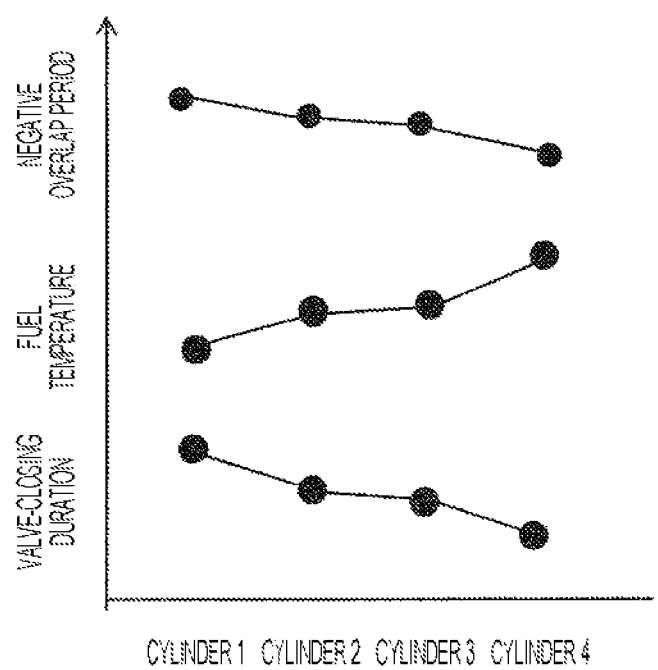
FIG. 23 is a chart illustrating, as an example, how to set the valve-closing duration and negative valve overlap period of each cylinder in the present embodiment.

FIG. 23 shows an example of the timings of the intake and exhaust valves during the HCCI operation. During the HCCI operation, a period during which both of the intake valve and the exhaust valve are closed, what is called a negative overlap period, is provided in a period ranging from the latter stage of an exhaust stroke to the former stage of an intake stroke. An exhaust gas is confined in a cylinder by this negative overlap to heat intake air in the cylinder. A longer negative overlap period causes the amount of residual gas confined in the cylinder to increase, and therefore the temperature of the air-fuel mixture increases.

With respect to the engine of the present example, the negative overlap period can be determined on a cylinder basis by controlling the opening and closing timings of the intake and exhaust valves by a solenoid-valve control instruction value that is transmitted from the ECU to the solenoid-valve driving circuit of each cylinder.

In the control device for the internal combustion engine according to the present embodiment, a negative overlap period of each cylinder is determined with respect to the valve-closing duration of the fuel injection valve as shown in FIG. 24. In other words, in the present embodiment, under operation conditions in which a ratio of fuel is lower than a theoretical mixture ratio, a negative overlap period of a cylinder in which the valve-closing duration of the fuel injection valve is short (that is to say, the fuel temperature is high) is set to be shorter than a negative overlap period of a cylinder in which the valve-closing duration of the fuel injection valve is long (that is to say, the fuel temperature is low). Consequently, the amount of residual gas in a cylinder in which the fuel temperature is high becomes smaller than that in a cylinder in which the fuel temperature is low. Accordingly, the deviation in temperature of the compressed air-fuel mixture among the cylinders, which is caused by the difference in fuel temperature, decreases, and the dispersion in the auto-ignition timing during the HCCI operation decreases. As the result, the fuel efficiency, exhaust, and operability (vibrations, noises) of the engine can be improved.

Incidentally, the present invention is not limited to the above-mentioned embodiments, and includes various modified examples. For example, the above-mentioned embodiments are described in detail in order to clearly explain the present invention. Therefore, the present invention is not always limited to the invention having all of the disclosed configurations.

In addition, the fuel temperature of fuel injected into a cylinder may be detected or estimated by a method different from the above, thereby determining, on the basis of the detected or estimated fuel temperature, the fuel injection valve control amount, the ignition control amount, or the intake and exhaust valve control amount on a cylinder basis. For example, as disclosed in PTL 2, temperature sensors are provided inside fuel injection valves respectively, and in an operation state in which the ignition delay angle control for avoiding knocking is performed by using the fuel temperatures of respective cylinders obtained by the temperature sensors, the ignition timing of a cylinder in which the fuel temperature is low may be set to be advanced with respect to the ignition timing of a cylinder in which the fuel temperature is high. In addition, by using the fuel temperatures of the respective cylinders obtained by the temperature sensors, immediately after engine cold starting of the engine, the injection timing of a cylinder in which the fuel temperature is high may be set to be advanced with respect to the injection timing of a cylinder in which the fuel temperature is low. Moreover, by using the fuel temperatures of the respective cylinders obtained by the temperature sensors, the injection pulse width of a cylinder in which the fuel temperature is high may be set to be shorter than the injection pulse width of a cylinder in which the fuel temperature is low. Further, the fuel temperatures of the respective cylinders obtained by the temperature sensors are used, fuel heating units for heating fuel injection valves respectively, and heating control units for controlling the quantities of heat supplied to the fuel heating units respectively are provided, and the quantity of heat supplied to a fuel heating unit that is provided in a cylinder in which the fuel temperature is low when the quantity of heat supplied to the fuel heating unit is made zero or minute may be set to be larger than the quantity of heat supplied to a fuel heating unit that is provided in a cylinder in which the fuel temperature is high when the quantity of heat supplied to the fuel heating unit is made zero or minute. Furthermore, by using the fuel temperatures of the respective cylinders obtained by the temperature sensors, in a state in which an engine is operated with an air-fuel ratio in which a ratio of fuel is lower than a theoretical air-fuel ratio, a negative valve overlap period of a cylinder in which the fuel temperature is high may be set to be shorter than a negative valve overlap period of a cylinder in which the fuel temperature is low.

The example of the in-cylinder injection spark ignition engine has been described above. However, the present invention is not limited to this. The present invention may be applied to diesel engines (compression ignition engines).

In addition, the fuel injection valve is also not limited to a solenoid-driven fuel injection valve. The fuel injection valve may be piezo-driven, magnetostrictor-driven, or the like. Moreover, a driving direction of the valve body may be based on not only the inward-opening valve described in the present example, but also an outward-opening valve.

In addition, a configuration of a certain example may be partially replaced with a configuration of another example, and a configuration of another example may be added to a configuration of a certain example. Moreover, a partial addition, deletion or replacement of a configuration of another example may be made to a part of a configuration of each example.

In addition, a part or all of the configurations, functions, processing units, processing means and the like described above may be realized by hardware, for example, by designing by use of an integrated circuit. Moreover, each of the configurations, functions and the like described above may be realized by software by causing a processor to interpret a program for realizing each function, and then to execute the program.

Information such as a program, a table and a file, which are used to realize each function, may be stored in a storage device such as a memory and a hard disk, or in a storage medium such as an IC card, an SD card and a DVD.

Furthermore, the control line and the information line are indicated when they are considered to be required for convenience of explanation, and therefore the control lines and the information lines are not always all indicated on a product. In actuality, it may be considered that most of the configurations are mutually connected to one another.

REFERENCE SIGNS LIST 2 engine block
10 cylinder
24 throttle valve
27 high-pressure fuel pump
28 high-pressure fuel pipe
29 fuel temperature sensor
71 electromagnetic intake valve
81 electromagnetic exhaust valve
100 fuel injection valve
105 solenoid
110 electric heater
111 heater controller
114 valve body
115 solenoid-valve control circuit
118 valve sheet
120 ECU
121 driving circuit

The invention claimed is:

1. A control device for an internal combustion engine, that controls an internal combustion engine provided with fuel injection valves for directly injecting fuel respectively into a plurality of cylinders, the control device comprising
a fuel temperature acquiring unit that acquires respective temperatures of fuel injected into the cylinders respectively, wherein at least one of a fuel injection valve control amount, ignition control amount, and intake and exhaust valve control amount of each of the cylinders is set in accordance with the respective temperatures of fuel acquired by the fuel temperature acquiring unit; and
a valve-closing time detecting unit that detects a valve-closing time of a valve body of each of the fuel injection valves: and a fuel temperature estimating unit that estimates the respective temperatures of fuel on the basis of the valve-closing duration of the valves detected by the valve-closing time detecting unit.

2. The control device for an internal combustion engine according to claim 1, wherein in an operation state in which an ignition delay angle control for avoiding knocking is performed, the ignition timing of a cylinder in which the valve-closing duration of the fuel injection valve is long is set to be advanced with respect to the ignition timing of a cylinder in which the valve-closing duration of the fuel injection valve is short.

3. The control device for an internal combustion engine according to claim 1, wherein immediately after engine cold starting of the internal combustion engine, the injection timing of a cylinder in which the valve-closing duration of the fuel injection valve is short is set to be advanced with respect to the injection timing of a cylinder in which the valve-closing duration is long.

4. The control device for an internal combustion engine according to claim 1, wherein an injection-duration instruction value of a cylinder in which the valve-closing duration of the fuel injection valve is short is made shorter than an injection-duration instruction value of a cylinder in which the valve-closing duration of the fuel injection valve is long.

5. The control device for an internal combustion engine according to claim 1, comprising: fuel heating units that heats the fuel injection valves respectively; and a heating control unit that controls a heat supply state in which heat is supplied to each of the fuel heating units,
wherein the quantity of heat supplied to a fuel heating unit of a cylinder in which the valve-closing duration of the fuel injection valve is long when the quantity of heat supplied to the fuel heating unit is made zero or minute is made larger than the quantity of heat supplied to a fuel heating unit of a cylinder in which the valve-closing duration of the fuel injection valve is short when the quantity of heat supplied to the fuel heating unit is made zero or minute.

6. The control device for an internal combustion engine according to claim 1, wherein in a state in which the engine is operated with an air-fuel ratio in which a ratio of fuel is lower than a theoretical air-fuel ratio, a negative valve overlap period of a cylinder in which the valve-closing duration of the fuel injection valve is short is made shorter than a negative valve overlap period of a cylinder in which the valve-closing duration of the fuel injection valve is long.

7. The control device for an internal combustion engine according to claim 6, comprising a second fuel temperature estimating unit that, by using fuel temperatures of at least two different cylinders estimated by the fuel temperature estimating unit, estimates fuel temperatures of the other cylinders.

8. A control device for an internal combustion engine, that controls an internal combustion engine provided with fuel injection valves for directly injecting fuel respectively into a plurality of cylinders, the control device comprising:
a valve-closing time detecting unit that detects a valve-closing time of a valve body of each of the fuel injection valves; and a fuel temperature estimating unit that estimates the temperature of fuel on the basis of the valve-closing duration of the valves detected by the valve operation detecting unit.

* * * * *